(12) United States Patent
Sivadas et al.

(10) Patent No.: US 11,047,972 B2
(45) Date of Patent: Jun. 29, 2021

(54) METHOD, APPARATUS AND DEVICE FOR DETERMINING A VELOCITY OF AN OBJECT IN A TIME SWITCHED MIMO RADAR SYSTEM

(71) Applicant: Steradian Semiconductors Private Limited, Bangalore (IN)

(72) Inventors: Apu Sivadas, Bangalore (IN); Gireesh Rajendran, Bangalore (IN)

(*) Notice: Subject to any disclaimer, the term of this patent is extended or adjusted under 35 U.S.C. 154(b) by 469 days.

(21) Appl. No.: 16/360,014

(22) Filed: Mar. 21, 2019

(65) Prior Publication Data

US 2020/0241125 A1 Jul. 30, 2020

(30) Foreign Application Priority Data

Jan. 28, 2019 (IN) .............................. 201941003409

(51) Int. Cl.
| | |
|---|---|
| *G01S 13/64* | (2006.01) |
| *G01S 13/532* | (2006.01) |
| *G01S 13/86* | (2006.01) |
| *G01S 7/35* | (2006.01) |
| *G01S 13/58* | (2006.01) |
| *G01S 7/40* | (2006.01) |

(52) U.S. Cl.
CPC .............. *G01S 13/64* (2013.01); *G01S 7/354* (2013.01); *G01S 13/532* (2013.01); *G01S 13/582* (2013.01); *G01S 13/86* (2013.01); *G01S 7/4073* (2021.05)

(58) Field of Classification Search
CPC ........ G01S 13/64; G01S 7/354; G01S 13/532; G01S 13/582; G01S 13/86; G01S 2007/4073
See application file for complete search history.

(56) References Cited

U.S. PATENT DOCUMENTS

| | | | |
|---|---|---|---|
| 6,396,436 B1* | 5/2002 | Lissel ..................... | G01S 13/34 342/104 |
| 9,784,820 B2* | 10/2017 | Arage ..................... | G01S 7/414 |
| 9,791,551 B1* | 10/2017 | Eshraghi ................. | G01S 7/038 |
| 2010/0127915 A1* | 5/2010 | Klotzbuecher ....... | G01S 13/584 342/112 |
| 2017/0042432 A1* | 2/2017 | Adib ....................... | G01S 7/415 |
| 2018/0261324 A1* | 9/2018 | Bradley ................. | A61B 5/4833 |
| 2019/0187246 A1* | 6/2019 | Behrens ................. | G01S 7/354 |

* cited by examiner

*Primary Examiner* — Marcus E Windrich (57) ABSTRACT

A multichannel radar system comprising a set of antennas each receiving a sequence of chirps reflected from plurality of objects, a range detector generating a set of range bins for each chirp, a beam former operative to generate a set of dominant frequency components from a group of range bins picked from the set of range bins across the set of antennas, a nearness detector for separating the set of dominant frequencies into a first set of dominant frequencies and a second set of dominant frequencies, a frequency subtractor configured to shift the each dominant frequency in the first set of dominant frequencies by its phase by a first value to form a third set of phase shifted dominant frequencies, and a Doppler estimator estimating a Doppler frequency of the each dominant frequency in the set of dominant frequencies from the third set of phase shifted dominant frequencies and the second set of dominant frequencies.

8 Claims, 7 Drawing Sheets

METHOD, APPARATUS AND DEVICE FOR DETERMINING A VELOCITY OF AN OBJECT IN A TIME SWITCHED MIMO RADAR SYSTEM

CROSS REFERENCES TO RELATED APPLICATIONS

This application claims priority from Indian patent application No. 201941003409 filed on Jan. 28, 2019 which is incorporated herein in its entirety by reference.

FIELD OF INVENTION

Embodiments of the present disclosure relate to high resolution radar system and in particular relate to a method, apparatus and device for determining a velocity of one or more objects in a time switched MIMO Radar System.

RELATED ART

Radar systems are generally employed for object detection and increasingly used in various automotive applications such as for driver assistance, obstacle detection, avoidance, and navigation of drones/UAVs for example. As is well known, Radars can detect surrounding obstacles or objects and send the relevant information like distance, relative position, and direction and velocity of the object that are in motion to a controller (software or hardware) or to a decision-making unit in the automotive device like UAV, drone, driver assistance.

In a frequency modulated continuous wave (FMCW) radar system, the radar signal transmitted through antennas is in the form of a varying frequency signal of a fixed duration referred to as chirp as is well known in the art. In that, received signal (the signal reflected from the object(s)) is mixed with the transmitted signal to generate a frequency tone representing the range and/or the velocity of the object.

In one conventional technique, the range and the velocity are resolved by employing a triangular chirp (a chirp containing both increasing and decreasing linear frequency variations). However, such technique requires at least 2N number of chirps to resolve the range and velocity of N number of objects. Thus, rendering the technique as inefficient for radar system employed for mapping higher number of objects like terrain mapping radar systems. Further, it increases system complexity to support multiple chirps as the hardware parameters need to have similar performance for all the required chirps.

In another conventional technique, the range and the velocity of the objects are resolved by transmitting number of fast FMCW chirps (for example, X number of chirps with higher rate of change of frequency) as is well known in the art. However, such technique exhibits disadvantages at least in terms of increased sampling rate for a given max Doppler (maximum velocity of the object that may be determined). The conventional techniques employing fast chirps are more fully described in the technical report titled FM/CW Radar Signals and Digital processing by Donald E. Barriok, distributed by National Technical Information Service, U. S. Department of Commerce, 5285 Port Royal Road, Springfield Va. 22151 dated July 1973, which is incorporated in its entirety by reference herein.

In yet another conventional technique the disadvantage of increased sampling rate in the fast chirp FMCW radar system is reduced by employing a slow chirp and an aliasing due to the slow chirp is resolved by Chinese remainder theorem (CRT) type scheme. However, such technique further exhibits disadvantage in terms of reduced resolution of Doppler. This reduced Doppler resolution may not be sufficient for coherent combining of data across multiple captures. This conventional techniques employing slow chirps with aliasing resolved is more fully described in the technical article titled Ambiguity elimination in HF FMCW radar systems by M Musa et al, published in IEE Proceedings—Radar Sonar and Navigation 147(4):182-188·September 2000, which is incorporated in its entirety by reference herein.

Accordingly, there is a need for a radar system that provides a higher maximum range, resolution with a low sampling rate.

SUMMARY

A multichannel radar system comprising a set of antennas each receiving a sequence of chirps reflected from plurality of objects, a range detector generating a set of range bins for each chirp, a beam former operative to generate a set of dominant frequency components from a group of range bins picked from the set of range bins across the set of antennas, a nearness detector for separating the set of dominant frequencies into a first set of dominant frequencies and a second set of dominant frequencies, a frequency subtractor configured to shift the each dominant frequency in the first set of dominant frequencies by its phase by a first value to form a third set of phase shifted dominant frequencies, and a Doppler estimator estimating a Doppler frequency of the each dominant frequency in the set of dominant frequencies from the third set of phase shifted dominant frequencies and the second set of dominant frequencies.

Several aspects are described below, with reference to diagrams. It should be understood that numerous specific details, relationships, and methods are set forth to provide full understanding of the present disclosure. Skilled personnel in the relevant art, however, will readily recognize that the present disclosure can be practiced without one or more of the specific details, or with other methods, etc. In other instances, well-known structures or operations are not shown in detail to avoid obscuring the features of the present disclosure.

DETAILED DESCRIPTION OF THE PREFERRED EXAMPLES

Figure 1:
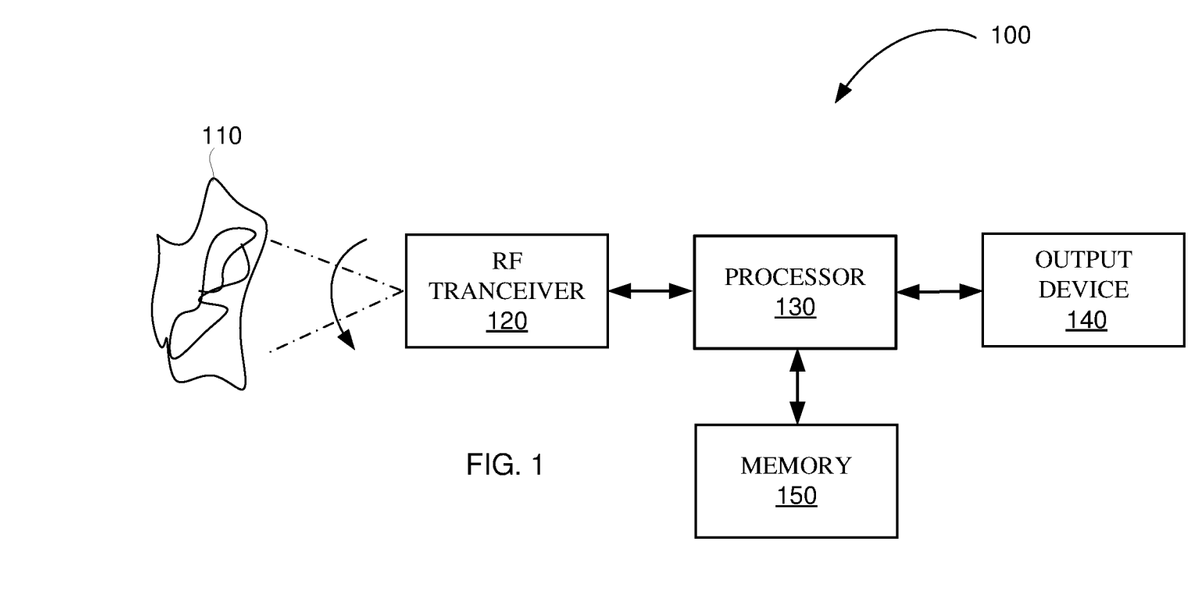
FIG. 1 is a block diagram of an example system 100 (environment) in which various aspects of the present invention may be seen.

FIG. 1 is a block diagram of an example system 100 (environment) in which various aspects of the present invention may be seen. The environment is shown comprising objects 110, Radio Frequency (RF) transceiver 120, processor 130, output device 140 and memory 150. Each element in the system 100 is further described below.

RF transceiver 120 transmits a radar (RF) signal over a desired direction(s) and receives a reflected radar signal that is reflected by the object 110. In one embodiment, the RF transceiver 120 may employ multiple (one or more) receiving antennas to receive the reflected RF signal and multiple (one or more) transmitting antenna for transmitting the radar signal. Accordingly, the transceiver 120 may employ these multiple transmitting/receiving antennas in several of multiple input and multiple output (MIMO) configurations to form desired transmitting and receiving RF signal beam (often referred to as Beam forming) to detect objects from the reflected signal. The objects 110 may comprise a terrain, terrain projections, single object, cluster of objects, multiple disconnected objects, stationary object, moving object, live objects etc.

Processor 130 conditions and processes the received reflected RF signal to detect one or more objects (for example 110) and determine one or more properties of the objects. The properties of the object thus determined (like shape, size, relative distance, velocity etc.) are provided to the output device 140. In an embodiment, the processor 130 comprises signal conditioner to perform signal conditioning operations and provides the conditioned RF signal for digital processing. The memory 150 may store RF signal like samples of the reflected RF signal for processing. The processor 130 may temporarily store received data, signal samples, intermediate data, results of mathematical operations, etc., in the memory 150 (such as buffers, registers). In an embodiment, processor 130 may comprise group of signal processing blocks each performing the specific operations on the received signal and together operative to detect object and its characteristics/properties.

The output device 140 comprises navigation control electronics, display device, decision making electronic circuitry and other controllers respectively for navigation, display and further processing the received details of the object. Accordingly, the system 100 may be deployed as part of unmanned vehicles, driver assistant systems for example for obstacle detection, navigation and control and in particular for terrain mapping.

In an embodiment, the RF transceiver 120, processor 130, and memory 150 are implemented as part of an integrated circuit integrated with other functionality and/or as a single chip integrated circuit with interfaces for external connectivity like the output device 140. The manner in which the transceiver 120 and the processor 130 (together referred to as Radar transceiver) may be implemented in an embodiment is further described below.

Figure 2:
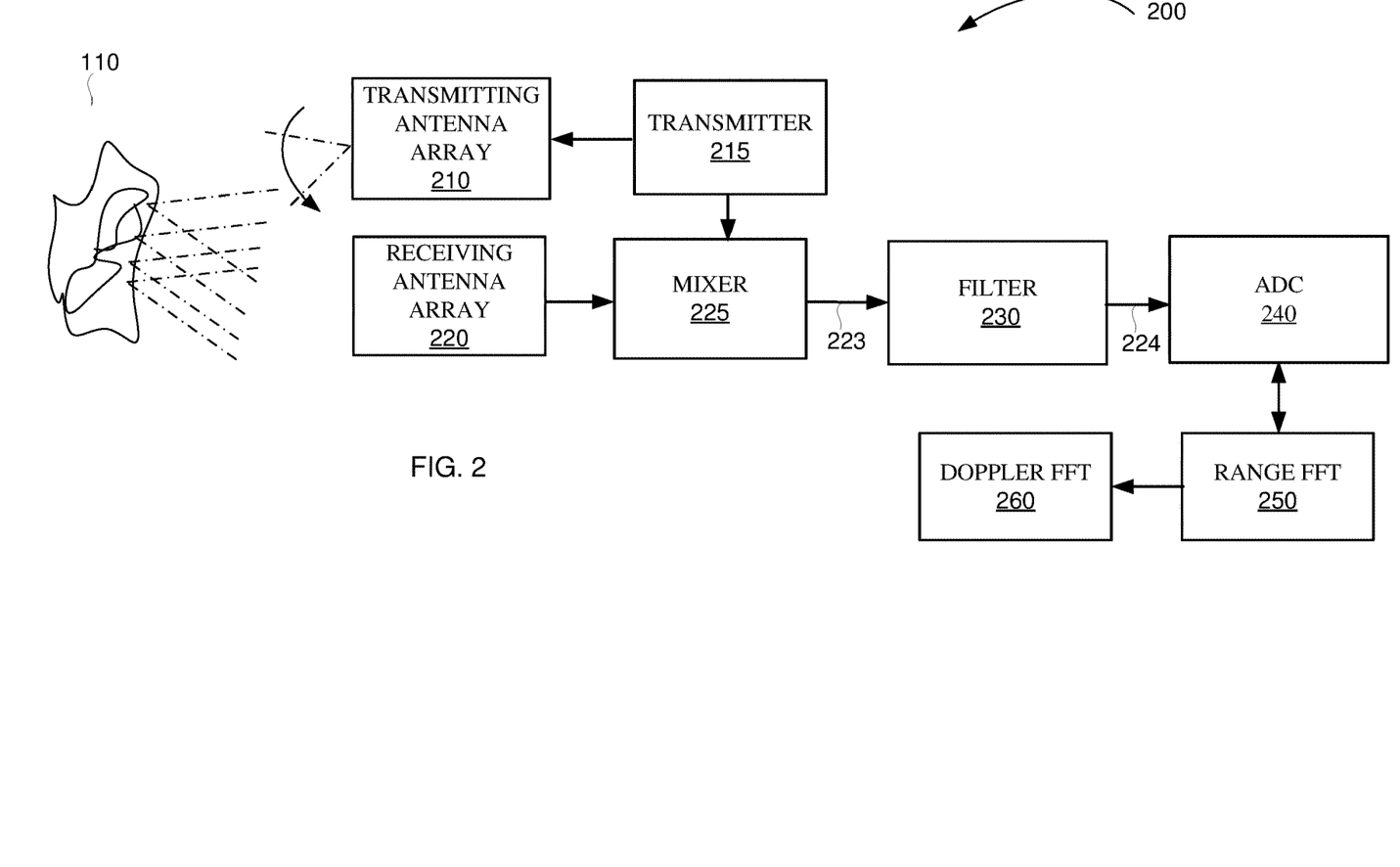
FIG. 2 is an example Radar transceiver for object detection and recognition in an embodiment.

FIG. 2 is an example Radar transceiver for object detection and recognition in an embodiment. The Radar transceiver 200 is shown comprising transmitting antenna 210, transmitter block 215, receiving antenna array 220, mixer 225, filter 230 Analog to digital convertor (ADC) 240, Range FFT 250, and Doppler FFT 260. Each element is described in further detail below.

Figure 3A:
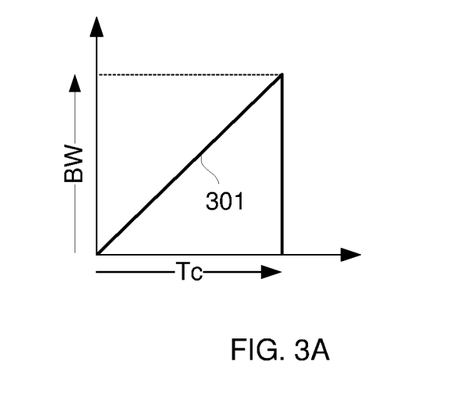
FIG. 3A illustrates an example chirp, in that, the chirp 301 is shown as linearly increasing frequency signal with a slope $\delta$, chirp Bandwidth BW, chirp width Tc.
Figure 3B:
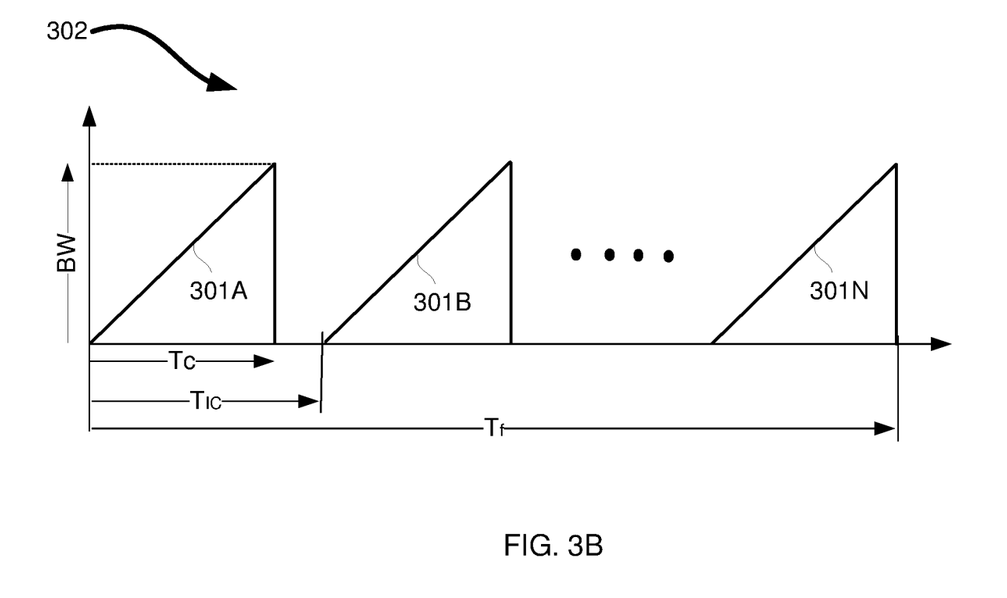
FIG. 3B illustrates a frame comprising sequence of chirps.

The transmitting antenna array 210 and the transmitter 215 operate in conjunction to transmit RF signal over a desired direction. The transmitter 215 generates a radar signal for transmission and provides the same to the transmitting antenna array for transmission. The transmitting antenna array 210 is employed to form a transmit beam with an antenna aperture to illuminate objects at suitable distance and of suitable size. Various known beam forming technique may be employed for changing the illuminated region. In one embodiment, the transmitter 215 may generate a radar signal comprising sequence of chirps. FIG. 3A illustrates an example chirp, in that, the chirp 301 is shown as linearly increasing frequency signal with a slope δ, chirp Bandwidth BW, chirp width Tc. FIG. 3B illustrates a frame comprising sequence of chirps. As shown there the frame 302 comprises N number of Chirps (301A-N) repeated at inter-chirp period $T_{IC}$ to form a frame 302 of duration $T_f$. In, that the inter-chirp duration $T_{IC}$ may be set same as $T_c$ or may be set to a non-uniform/uniform different values in the frame 302.

Continuing with FIG. 2, the receiving antenna array 220 comprises M antenna elements each element capable of receiving reflected RF signal. For example, an M number of antenna elements may be arranged in U rows and V columns forming a two-dimensional array of U×V antenna elements. The RF signal received on each element is provided to the mixer 225.

The Mixer 225 mixes RF signal received on each of M antenna elements with the transmitted chirp (local oscillator frequency) to generate an intermediate frequency signal (IF signal). In that the mixer 225 may comprise M number of mixers to mix each RF signal received on the corresponding M antenna elements. Alternatively, the mixer 225 may comprise a fewer mixers multiplexed to perform desired operation. The M number of intermediate frequency(IF) signal is provided on path 223 to filter 230. The filter 230 passes the IF signal attenuating the other frequency components (such as various harmonics) received from the mixer. The filter 230 may be implemented as a pass band filter to pass a desired bandwidth (in conjunction with chirp bandwidth BW). The filtered IF signal is provided on path 234 to ADC 240.

The ADC 240 converts IF signal received on path 234 (analog IF signal) to digital IF signals. The ADC 240 may sample the analog IF signal at a sampling frequency $F_s$ and convert each sample value to a bit sequence or binary value. In one embodiment the ADC 240 may generate 256/512/1024 samples per chirp signal. The digitised samples of IF signal (digital IF signal) is provided for further processing.

The Range Fast Fourier transform (FFT) 250, perform P point FFT on the digital IF samples to generate plurality of ranges of the plurality objects 110. For example, range FFT 250 performs FFT on digital IF signal corresponding to each chirp. The Range FFT 250 produces peaks representing the ranges of the objects.

The Doppler FFT 260 performs FFT operation on the ranges across N chirps. The peaks in the Doppler FFT represent the Doppler of the objects or the velocity of the objects. The manner in which the range FFT 250 and Doppler FFT 260 may be implemented in an embodiment is further described below.

Figure 4:
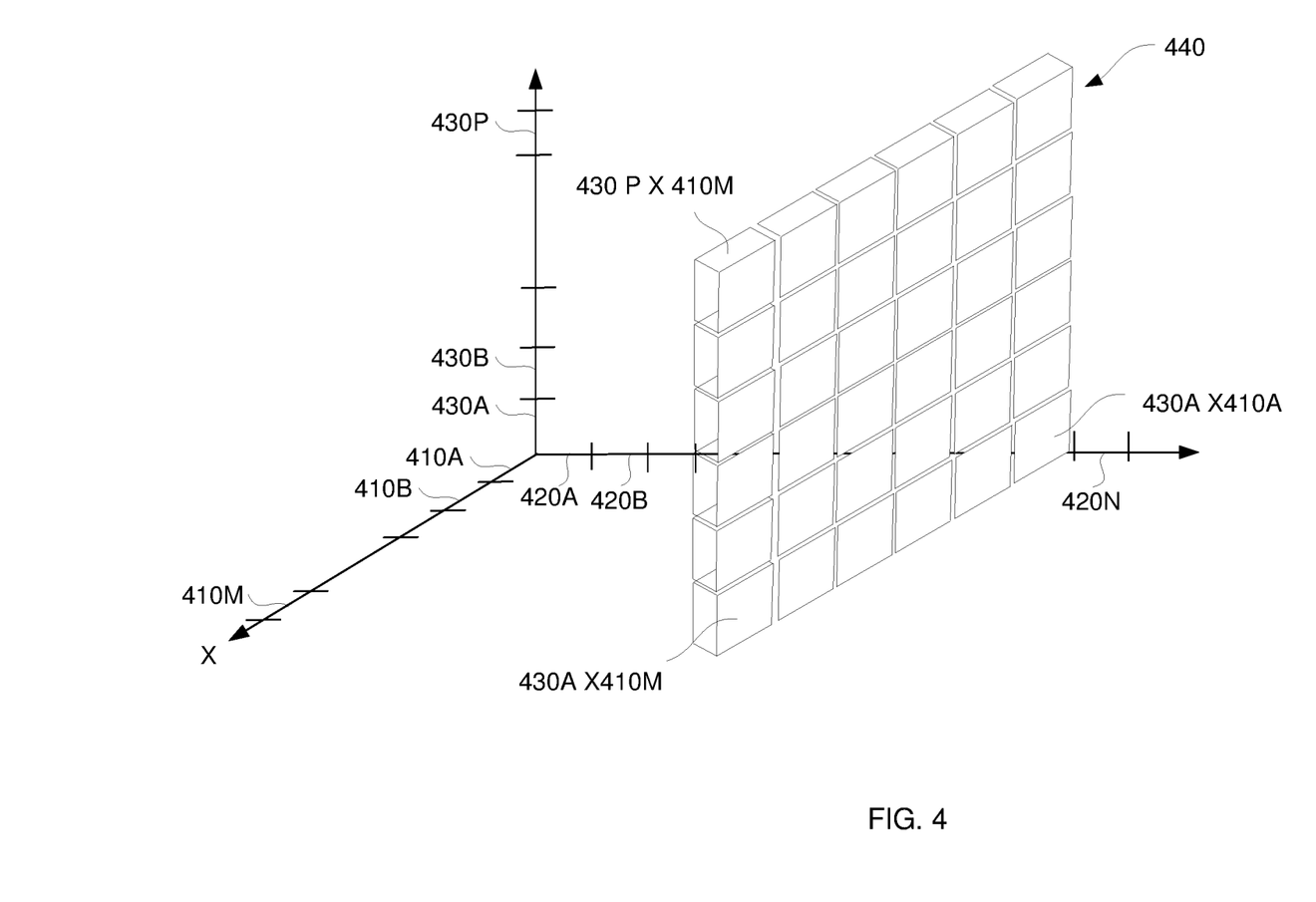
FIG. 4 is a three-dimensional diagram illustrating a range bins per chirp per antenna in an embodiment.

FIG. 4 is a three-dimensional diagram illustrating a range bins per chirp per antenna in an embodiment. As shown there 410A-M on X- axis represents the M antennas, 420A-N on Y-axis represents N chirps, and 430A-P represents range bins. As may be seen, for every chirp k, there are P number of range data (range bins) across each of M antenna elements. Range FFT 250 provides P×M range bins across the M antennas for every $k^{th}$ chirp and is represented as 440.

The chirp bandwidth, slope, chirp period, are adjusted to obtain a desired maximum range, rage resolution, maximum velocity and the velocity resolution. As is well known in the art, the maximum velocity (maximum Doppler) $V_{dmax}$ is equal to $c/(4*f_o*T_{ic})$ or $V_{dmax}$ is proportional to $1/T_{ic}$ (or $1/T_c$). In that, $f_o$ is carrier frequency of the chirp. Achievable range resolution, $R_{res}$ will be equal to c/(2*BW). Radar range/range resolution is equal to N, same as the number of ADC samples per chirp. This will set the ADC sampling frequency equal to 1/(Tc*N) or ADC sampling frequency is proportional to $V_{dmax}$*(Range/$R_{res}$). Further, the resolution of the velocity ($V_{res}$) is equal to $V_{dmax}$/number of chirps in the frame. Accordingly, to obtain both higher $V_{dmax}$, $R_{res}$ and better V, the sampling frequency of the ADC needs to be very large and number chirps needs to be high. Such requirements make realising a radar system non-feasible at least in some applications. Large number of chirps at high sampling rate increases the data size as well.

The manner in which the Doppler FFT 260 may be implemented to provide increased $V_{dmax}$ and better $V_{res}$ in an embodiment is further described below.

In one embodiment, the transmitter is configured to employ a chirp period $T_c$ that sub-samples the maximum Doppler $V_{dmax}$. In that, lesser number of chirps is used within the frame. In one embodiment the chirp to chirp period (hereafter simply referred as chirp period) is set to different values. For example, the chirp period among the first N/2 chirps may be set to a value $T_{IC1}$ and the chirp period among the next N/2 chirps may be set to a value $T_{IC2}$. Increase of the chirp period by a factor of say L from original will reduce the unambiguous velocity to Vdmax/L. In one embodiment, the ambiguity in determining the velocity within the $V_{dmax}$ is reduced by making use of (employing) data across antennas even when the $V_{dmax}$ is sub sampled.

Figure 5:
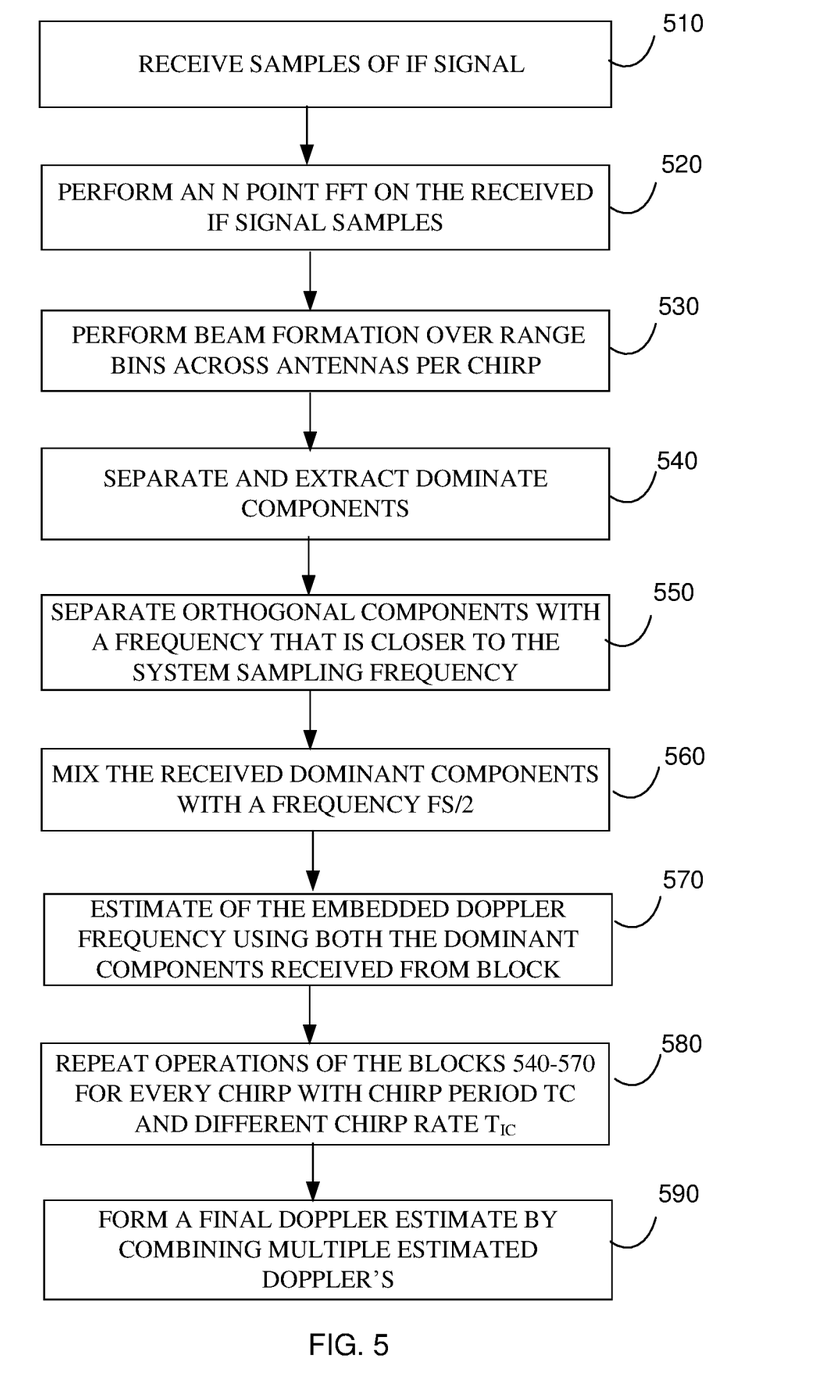
FIG. 5 is a block diagram illustrating the manner in which ambiguity in determining the velocity within the $V_{dmax}$ is reduced when the $V_{dmax}$ is sub sampled in an embodiment.

FIG. 5 is a block diagram illustrating the manner in which ambiguity in determining the velocity within the $V_{dmax}$ is reduced when the $V_{dmax}$ is sub sampled in an embodiment. In the block 510, the range FFT 250 receives samples of IF signal. The samples of the IF signal may be received from the ADC 240. For example, the samples of IF signal may be generated per antenna per chirp basis thereby providing a set of samples over each chirp for every antenna element.

In block 520, the range FFT 250 performs a P point FFT on the received IF signal samples. For example, the range FFT 250 may perform FFT operation on the set of samples corresponding one of the (each) chirp and one (each) antenna element to produce set of range bins with one or more range peaks.

Figure 6:
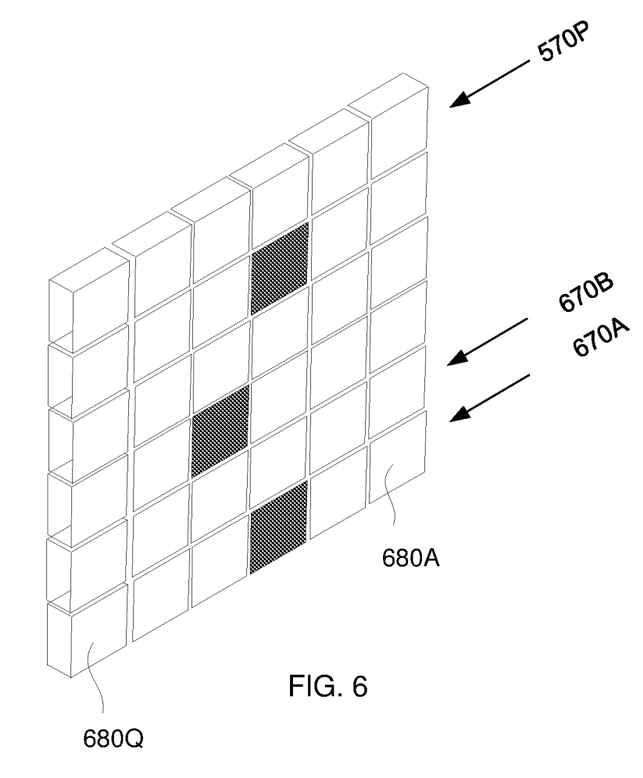
FIG. 6 illustrates Q sets of beams corresponding P range bins.

In block 530, the beam formation is performed over range bins 440 across M antennas per chirp. In one embodiment, a Q-point FFT operation on the P range bins over the antenna array provides Q number of beams in Q directions for each chirp. For example, the first range bins (430A) across M antenna array (430A-410M) are passed on to Q point FFT operation to generate first set of Q beams. The second range bins (430B) across M antenna array (430B-410M) are passed on to Q point FFT to generate second set of Q beams. Similarly, the Q beams are formed for all the range bins 430A-P across the 410 A-M antenna elements to generate P sets of Q beams. FIG. 6 illustrates P sets of beams corresponding P range bins. As shown there the each set (sets 670A-P) comprises Q number of beams 680A-Q. The darker shades represent peaks (dominant components) in the respective set of beams, for example.

In block 540, the dominate components are separated or extracted. In one embodiment, the magnitudes of the orthogonal frequency components of the Q-point FFT that are greater than a threshold value are separated/extracted. Accordingly, the Q point FFT provides Frequency components corresponding to the direction of the detected objects.

In block 550, the detected components phase variation across adjacent chirps are evaluated as an initial estimate of doppler frequency. Components with frequency that is closer to the sampling frequency fs of ADC 240 are separated and provided to the block 560 and the orthogonal components with a frequency that are not close to the sampling frequency fs are provided to the block 570.

In block 560, the received dominant components are mixed with a frequency component fs/2. The mixing operation may result in rotating the phase by Pi radians of the dominant components that are close to fs/2. The dominant component rotated by the angle pi is provided to the block 570.

In block 570, an estimate of the embedded Doppler frequency is generated using both the dominant components received from block 550 and mixed dominant component received from 560. The dominant frequency components that are mixed in block 560 are corrected before performing the estimation of the Doppler. In block 580, the operations of the blocks 540-570 are repeated for every set of chirps with chirp period $T_ic$. In block 590, multiple such estimated Doppler's are combined to form a final Doppler estimate. The manner in which the Doppler frequency is estimated is further described below.

Figure 7:
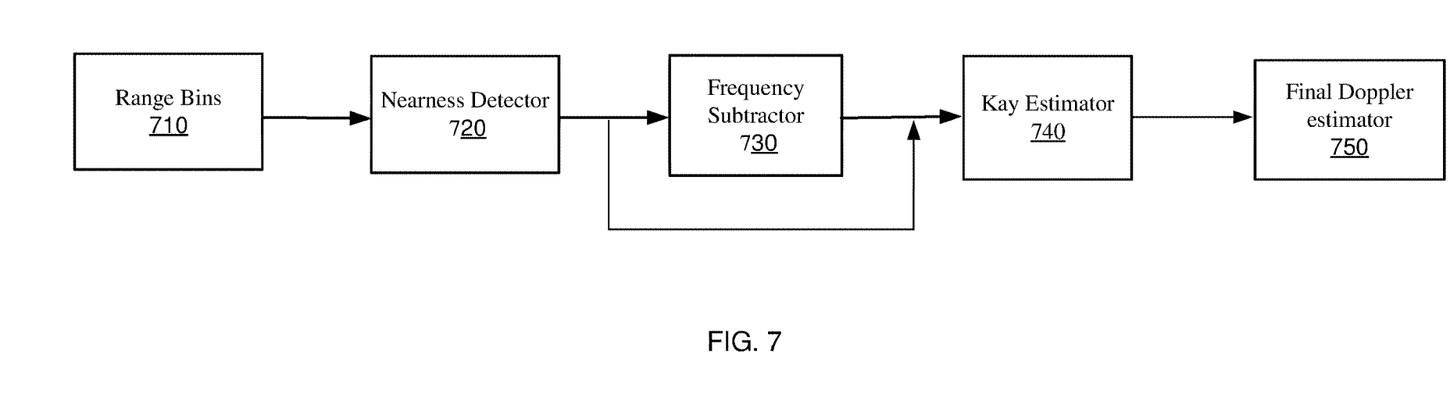
FIG. 7 is a block diagram illustrating estimation of the Doppler in one embodiment.

FIG. 7 is a block diagram illustrating estimation of the Doppler in one embodiment. The block diagram is shown comprising dominant frequency 710, nearness detector 720, frequency subtractor 730, Kay estimator 740, and final Doppler estimator 750. Each block is described below in further detail.

The dominant frequency 710 is a source of dominant frequency in the beams formed across antenna elements of range bins. In one embodiment, the dominant frequencies are derived from the beams 670A-Q. For example, each beam may be represented as complex number resulting from the FFT operation on the range bins. The dominant frequencies are selected when the magnitude of the complex number is greater than a pre-set (threshold) value. Alternatively, the dominant frequency may be selected when the phase angle is greater than threshold value (for example $\pi/4$). The dominant frequency component in kth chirp is represented as $a_k$. The Dominant frequency components are provided the nearness detector 720.

The nearness detector 720 detects if the phase of the dominant frequency component is within a threshold. In one embodiment the nearness detector determines a phase difference or change of phase of the dominant frequency component over multiple chirps. The nearness detector 720 determines the change in phase $\Delta\phi$ using relation:

$$\Delta\phi = \frac{1}{N} \sum_{k=0}^{k=N-1} |\angle(a_{k+1} \cdot a_k^*)|.$$

In that, k represents the chirps, $a_{k+1}$ represents the dominant frequency component in the k+1$^{th}$ chirp, $a^*_k$ representing the complex conjugate of the corresponding dominant frequency component in the k$^{th}$ chirp, with other symbols representing the usual mathematical operations as is well known in the art.

The nearness detector 720 determines the dominant frequency component as near when $\Delta\phi > \pi/2$ and provides the dominant frequency component to frequency subtractor 730. The nearness detector 720 determines the dominant frequency component as not near when $\Delta\phi \leq \pi/2$ and provides the dominant frequency component to the Kay estimator 740.

The frequency subtractor 730 shifts the phase of the dominant frequency component received from the nearness detector. In one embodiment, the frequency subtractor 730 shifts the frequency/phase of the dominant frequency component using relation: $\alpha_k = \alpha_k \cdot e^{jk\pi}$. In the relation, $e^{jk\pi}$ translates to +1 and −1 for even and odd values of k. The phase shifted dominant frequency components are provided to the Kay estimator 740.

The Kay estimator 740 provides a frequency estimate of a dominant frequency component from the corresponding dominant components in all the chirps. In one embodiment, the Kay estimator 740 determines the frequency $f_{est}$ using a relation: $f_{est} = \Sigma_{k=0}^{k=N-1} w_k \angle (\alpha_{k+1} \cdot \alpha^*_k)$. In that $w_k$ representing a weighing factor. The estimated frequency of the dominant frequency $f_{est}$ is provided to the final Doppler estimator 750.

The final Doppler estimator 750 provides the Doppler frequency or the velocity of the objects from the estimated frequency of the dominant frequency component. In one embodiment, the final Doppler estimator 750 generates the Doppler frequency $f_{Doppler}$ using relation:

$$f_{Doppler} = f_{est} - \frac{F_s}{2},$$

when the $f_{est}>0$ and $$f_{Doppler} = f_{est} + \frac{F_s}{2},$$

when the $f_{est}<0$.

As may be appreciated, the ambiguity and noise due to the under sampling is reduced by employing additional dimension (signal from the multiple channels/antenna) of operation in the Doppler frequency determination.

While various embodiments of the present disclosure have been described above, it should be understood that they have been presented by way of example only, and not limitation. Thus, the breadth and scope of the present disclosure should not be limited by any of the above-discussed embodiments, but should be defined only in accordance with the following claims and their equivalents.

What is claimed is:

1. A multichannel radar system (100) comprising:
   a set of antennas (410A-M) each receiving a sequence of chirps (420A-N) reflected from plurality of objects (110);
   a range detector (250) generating a set of range bins (440) for every chirp in the sequence of chirps (420A-N);
   a beam former configured to generate a set of dominant frequency components from a group of range bins (430A-P) picked from the set of range bins (440) across the set of antennas (410A-M);
   a nearness detector (720) configured to compare frequency of an each dominant frequency in the set of dominant frequencies with a sampling frequency to separate the set of dominant frequencies into a first set of dominant frequencies that are determined as a close to the sampling frequency and a second set of dominant frequencies that are determined as a not close to the sampling frequency;
   a frequency subtractor (730) configured to shift the each dominant frequency in the first set of dominant frequencies by its phase by a first value to form a third set of phase shifted dominant frequencies; and
   a Doppler estimator (750) estimating a Doppler frequency of the each dominant frequency in the set of dominant frequencies from the third set of phase shifted dominant frequencies and the second set of dominant frequencies.

2. The multichannel radar system of claim 1, further comprising a frequency estimator configured to generate a set of estimated frequencies for the second set of dominant frequencies and the third set of phase shifted dominant frequencies from a group of dominant frequencies selected across the sequence of chirps.

3. The multichannel radar system of claim 2, wherein the nearness detector is configured to measure change in phase $\Delta\emptyset$ of the each dominant frequency across the sequence of chirps using relation:

$$\Delta\emptyset = \frac{1}{N} \sum_{k=0}^{k=N-1} |\angle(a_{k+1} \cdot a^*_k)|,$$

in that, k represents a kth chirp in the sequence of chirps, $\alpha_{k+1}$ represents the dominant frequency in the $k+1^{th}$ chirp, $\alpha^*_k$ representing the complex conjugate of the corresponding dominant frequency in the $k^{th}$ chirp.

4. The multichannel radar system of claim 3, wherein the close representing the condition $\Delta\emptyset > \pi/2$ and the not close representing a condition $\Delta\emptyset \leq \pi/2$.

5. The multichannel radar system of claim 4, wherein the frequency subtractor is configured to shift the phase using relation: $\alpha_k = \alpha_k \cdot e^{jk\pi}$.

6. The multichannel radar system of claim 5, wherein the frequency estimator generate an estimated frequency $f_{est}$ in the set of estimated frequencies using relation: $f_{est} = \Sigma_{k=0}^{k=N-1} w_k \angle (\alpha_{k+1} \cdot \alpha^*_k)$, in that $w_k$ representing a weighing factor.

7. The multichannel radar system of claim 6, wherein the Doppler estimator estimate the Doppler frequency $f_{Doppler}$ using relation:

$$f_{Doppler} = f_{est} - \frac{F_s}{2}$$

when the $f_{est}>0$ and $$f_{Doppler} = f_{est} + \frac{F_s}{2},$$

when the $f_{est}<0$, wherein the $F_s$ is the sampling frequency.

8. A method of determining a Doppler velocity in a multichannel radar system (110) employing sequence of chirps (420A-N) comprising:
   generating range bins across the multiple channels and the multiple chirps;
   forming multiple beams (530) over the range bins selected across the multiple channels;
   selecting (540) dominant components in the multiple beams;
   shifting (560) the phase of the dominant components that are close to a sampling frequency to form a phase shifted dominant component;

estimating (570) frequencies of dominant components and the phase shifted dominant components from the dominant components across multiple chirps; and determining (590) the Doppler velocities from the estimated frequencies.

\* \* \* \* \*